United States Patent
Feik

(10) Patent No.: US 6,708,993 B2
(45) Date of Patent: Mar. 23, 2004

(54) LADDER DOLLY

(76) Inventor: Frederick G. Feik, 4964 Country Rd. 19, Maple Plain, MN (US) 55359

( * ) Notice: Subject to any disclaimer, the term of this patent is extended or adjusted under 35 U.S.C. 154(b) by 0 days.

(21) Appl. No.: 09/758,600

(22) Filed: Jan. 11, 2001

(65) Prior Publication Data

US 2002/0089135 A1 Jul. 11, 2002

(51) Int. Cl.$^7$ ................................................ B62B 1/26
(52) U.S. Cl. ....................................................... 280/63
(58) Field of Search ..................... 280/1.5, 47.131, 280/47.19, 47.28, 47.3, 47.32, 47.331, 63, 78, 79.7, DIG. 6; 182/20, 127; 16/30, 42 T

(56) References Cited

U.S. PATENT DOCUMENTS

| | | | |
|---|---|---|---|
| 2,570,656 A | * 10/1951 | Dustin et al. | 280/47.331 |
| 4,564,203 A | * 1/1986 | Wilson | 280/47.32 |
| 4,602,802 A | * 7/1986 | Morgan | 280/47.331 |
| 5,566,780 A | * 10/1996 | Bambrough | 182/20 |
| 5,779,250 A | * 7/1998 | Becht | 280/47.331 |
| 5,833,028 A | * 11/1998 | Ramsey et al. | 182/129 |
| 5,882,023 A | * 3/1999 | Swager | 280/47.32 |
| 6,076,636 A | * 6/2000 | Tietge | 182/129 |
| 6,352,135 B1 | * 3/2002 | Jones | 182/129 |
| 6,361,057 B1 | * 3/2002 | Carter | 280/63 |
| 6,585,084 B2 | * 7/2003 | Gannon | 182/129 |
| 6,592,134 B2 | * 7/2003 | Abraham | 280/79.7 |

FOREIGN PATENT DOCUMENTS

| | | | |
|---|---|---|---|
| FR | 1.537.005 | * 8/1968 | 280/47.32 |
| FR | 2.537.527 | * 6/1984 | 280/47.331 |

* cited by examiner

*Primary Examiner*—Frank Vanaman
(74) *Attorney, Agent, or Firm*—Westman, Champlin & Kelly, P.A.

(57) ABSTRACT

A wheeled dolly for the ladder has an axle that has a pair of wheels mounted thereon, which are spaced sufficiently apart for stability. The axle supports a central tube that will slip into a hollow rung of an aluminum or fiberglass ladder. The upright member has a transverse plate fastened in place for supporting a side rail of the ladder. The wheels on the axle will support one end of the ladder while the other end is raised by an operator for transport. The dolly will trail easily because of the offset of the line of force from the load of the ladder relative to the axle.

10 Claims, 3 Drawing Sheets

LADDER DOLLY

BACKGROUND OF THE INVENTION

The present invention relates to a wheeled dolly that will quickly attach to hollow rung ladders, presently made of aluminum or fiberglass, and which can be used for transporting the ladder easily across terrain. The dolly is also small enough so that it can be left installed when the ladder is stored, and when in use.

Various wheeled ladder caddies or dollies have been advanced for supporting ladders while transporting them, including, for example, U.S. Pat. Nos. 4,049,283 and 5,727,799. These ladder caddies, however, are unwieldy, and support the ladder with the plane of the ladder rungs horizontal or parallel to the ground, so that a substantial amount of space is taken up. The dollies cannot be left on the ladders for storage.

SUMMARY OF THE INVENTION

The present invention relates to a ladder dolly that has an upright support rod which extends through a rung of a hollow rung ladder. The rod is supported on a cross axle at the lower end, with wheels on the axle. The support rod of the dolly slips into place quickly, and then can be used for transporting the ladder with the plane of the ladder perpendicular to the ground.

The support rod that passes through the rung is preferably offset from the axis of the axle for the wheels, so that the dolly will caster and track easily when the ladder is pulled. The dolly is preferably installed near one end of the ladder, and the other end is lifted by the operator movement. The ladder can be balanced on the dolly to reduce the weight lifted by the operator when the ladder is moved. The location of the dolly is normally a matter of choice of the operator, but generally it will be placed on the second or third rung from the bottom.

The ladder dolly is easily manufactured and installed. The ladder dolly is made so that it will take little extra space when the ladder is stored on hooks or the like.

DETAILED DESCRIPTION OF THE PREFERRED EMBODIMENTS

Figure 1:
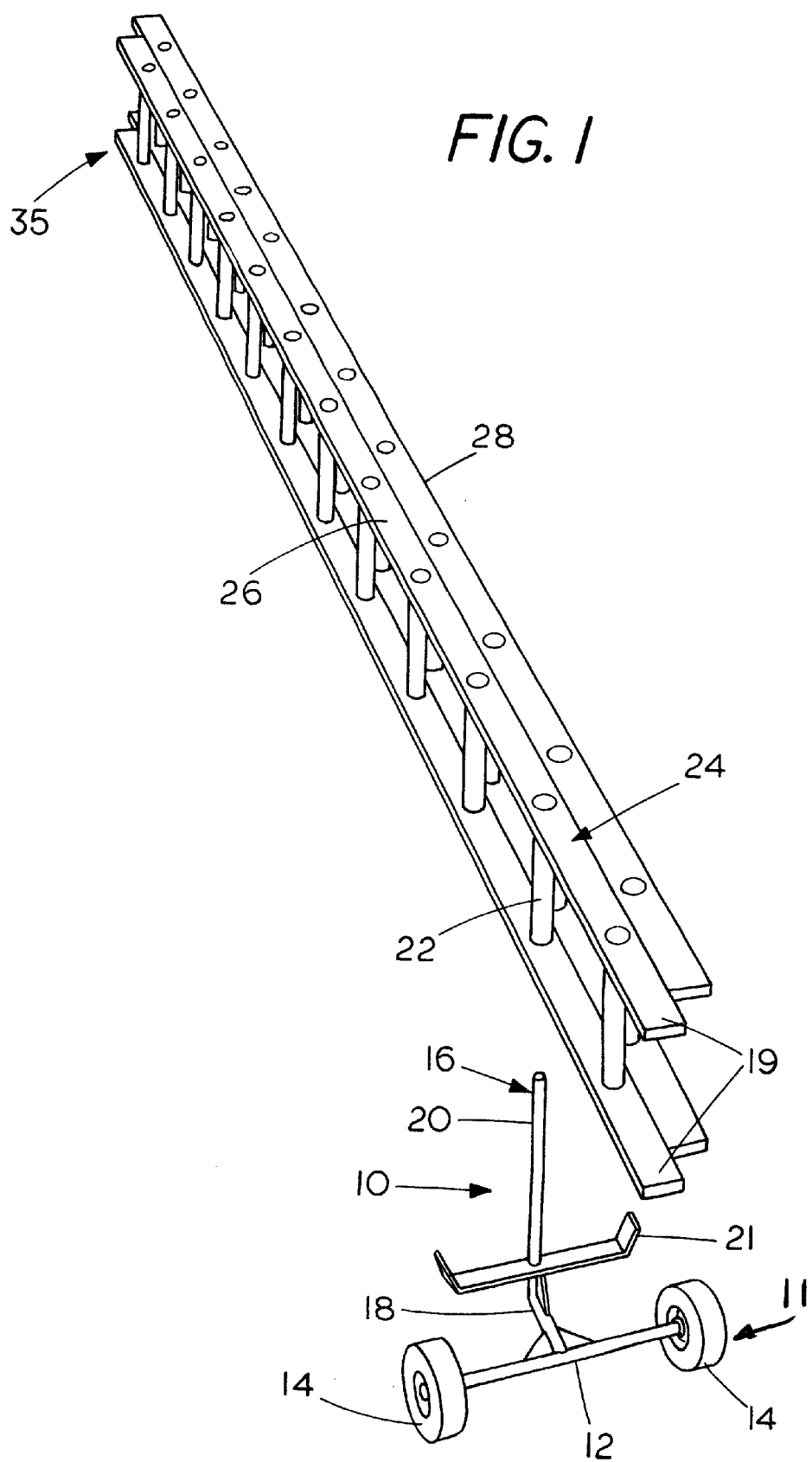
FIG. 1 is an exploded perspective view of a ladder dolly made according to the present invention about to be assembled onto a ladder.

In FIG. 1, a dolly 10 made according to the present invention has a frame 11 including a transverse axle 12, and a pair of wheels 14, 14 at opposite ends of the axle that are rotatably mounted on the axle. A ladder support 16 includes a rod or tube having a horizontal or offset section 18 which offsets the axis of an integral vertically extending rod section 20 from the axis of the wheels 14. The vertical rod section 20 is a tube that is of size to fit within a hollow rung 22 of a ladder 24. A ladder support 21 is fixed to the vertical tube section 20. As shown, the ladder 24 is an extension ladder, which can be quite long and heavy, and includes a base section 26 and an extension section 28 that can adjust up and down on the base section 26 as desired for extension purposes.

Figure 2:
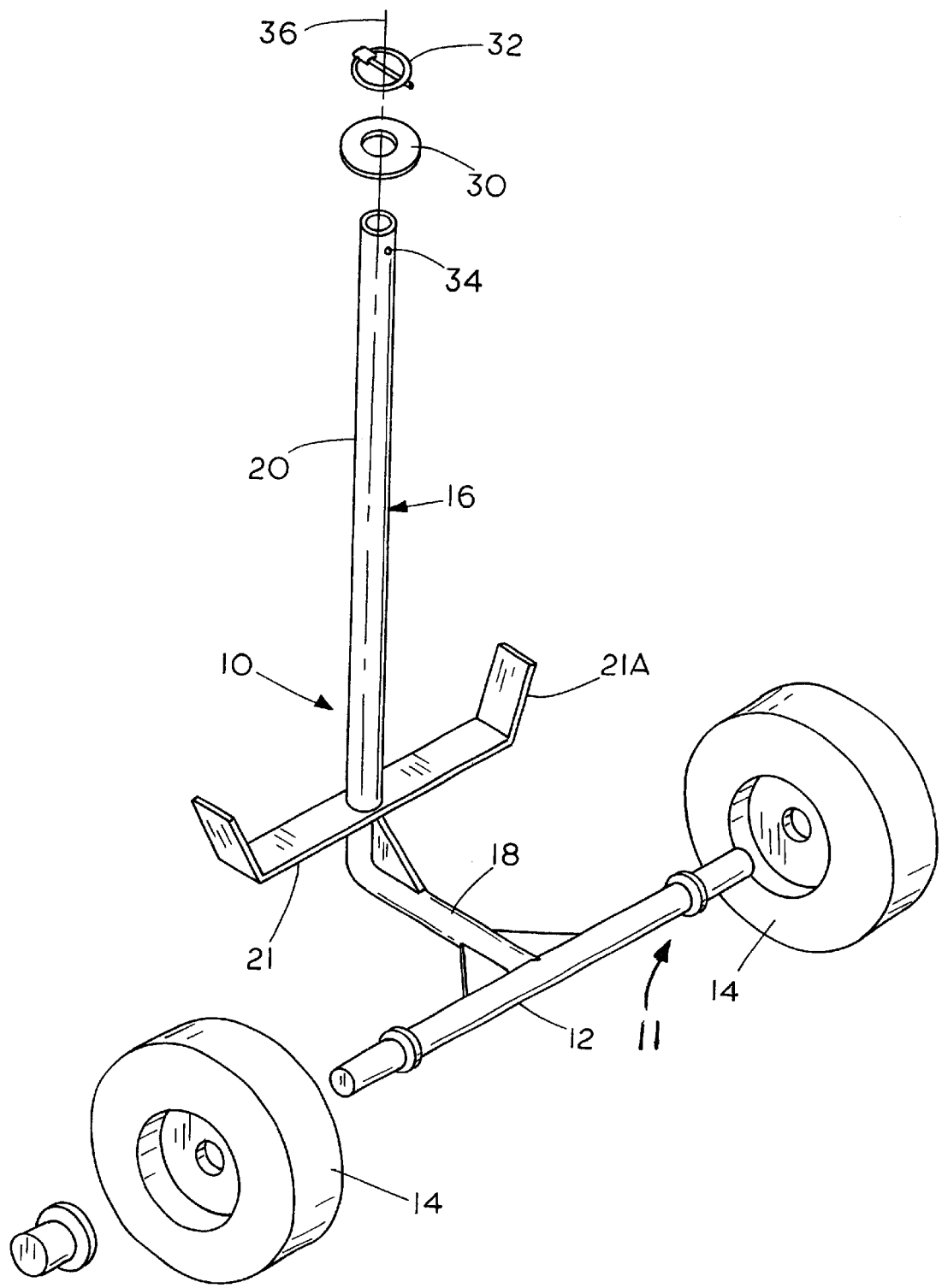
FIG. 2 is a perspective view of the dolly without the ladder in place.
Figure 3:
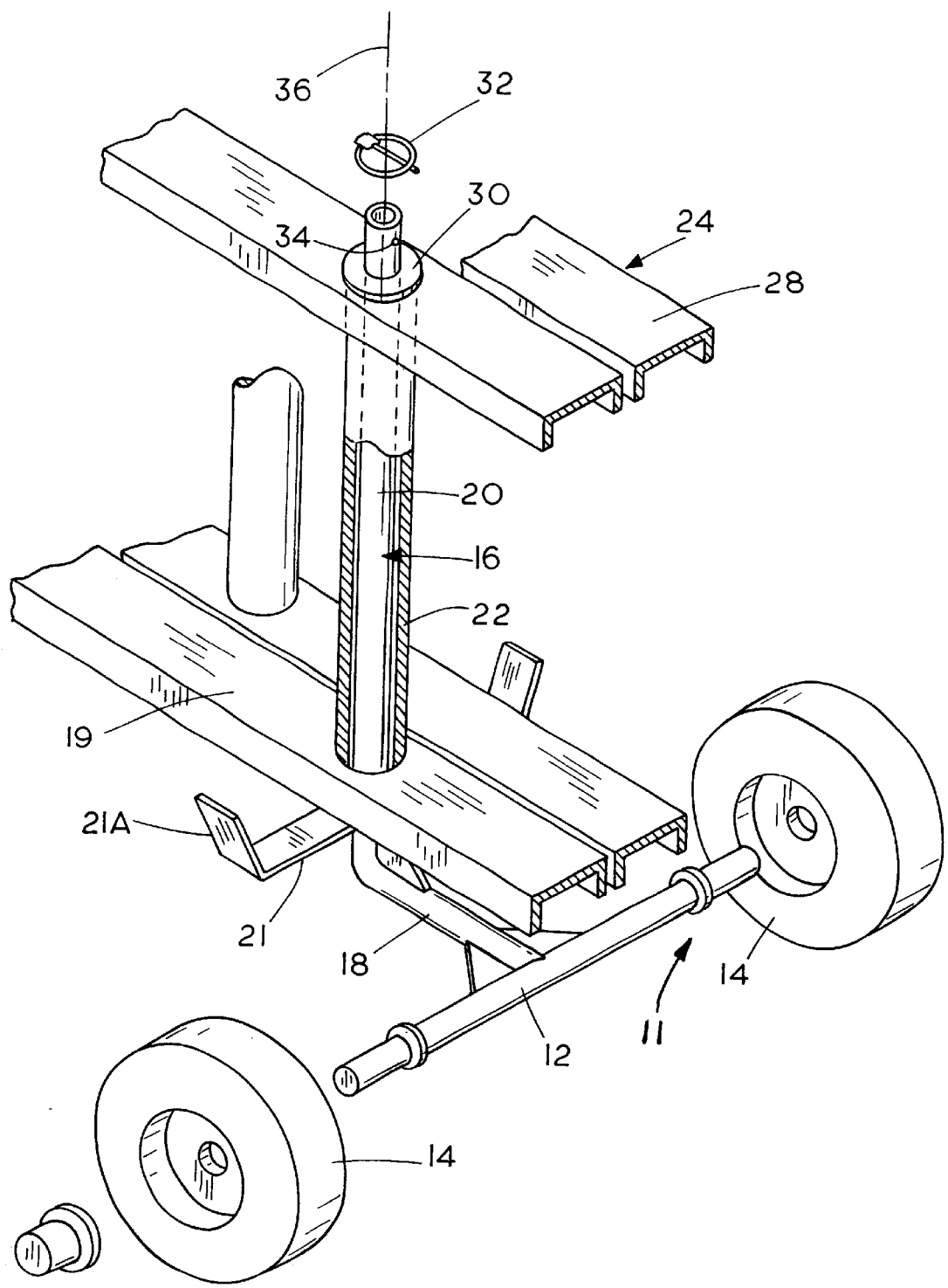
FIG. 3 is a perspective view similar to FIG. 2, but schematically showing the ladder in place on the dolly.

The ladder dolly 10 of the present invention is used by slipping the vertical tubular rod section 20 through the bar or opening of a tubular ladder rung 22, and then after one of the ladder side rails 19 rests on support 21, securing ladder in place (loosely at least) in a desired manner. For example, as shown in FIGS. 2 and 3, the vertical rod section 20 can have a washer 30 overlying the upper side rail of the ladder section 26, and then a pin of a ring lock pin 32 can be passed through an aperture 34 in the vertical rod section 20 and snapped in place to hold the rod section 20 from coming out of the rung 22.

It can be seen that the horizontal offset section 18 offsets the axis 36 of the vertical section 20, so that the axis of the wheels 14 or the axle 12 is in a position to trail the line of load application, so that when the operator lifts an end 35 of the ladder 24, opposite from the dolly 10, and pulls, the wheels 14 caster and will trail easily and the dolly will swivel into place by twisting in the hollow rung 22.

The length of the vertical rod section 20 can be adjusted to fit existing ladders, and, if desired, a number of apertures 34 at different heights be provided so there would be adjustment for different size ladders.

The transverse ladder support 21 that supports the ladder 24 can be a flat plate or strap with bent up end tabs 21A as shown, or can be of other suitable designs. The ladder support 21 is positioned above the horizontal offset section 18 a sufficient amount so there is no interference with the wheels 14 or the axle 12. The transverse ladder support 21 extend transversely to the upright member.

The dolly is lightweight so it can be installed easily, and left in place during storage. It also can maintain in place when the ladder is used since it extends to one side of the ladder. The axle 14 and ladder support 16 can be suitably braced for adequate strength. The wheels are selected to roll easily and to be large enough to roll over the ground. The wheels are laterally spaced for stability. If desired, the vertical section 20 does not have to extend all the way through the rung 22, but the dolly should be securable on the ladder so it does not fall off. Instead of two wheels, a single wheel or roller can be used. The term wheel is meant to include a roller as well.

Although the present invention has been described with reference to preferred embodiments, workers skilled in the art will recognize that changes may be made in form and detail without departing from the spirit and scope of the invention.

What is claimed is:

1. A support for transporting a ladder having a plurality of hollow rungs with interior openings, the hollow rungs extending transversely between a pair of spaced apart, longitudinally extending side rails, the side rails having openings aligning with the interior openings of the hollow rungs, the support comprising a frame having at least one support wheel rotatably mounted on the frame, an upright member that has a cross section sized to slidably fit through an opening in one side rail and within the interior opening of one of the hollow rungs of the ladder with which it is to be used, said upright member being supported on at least one wheel and of length to extend through at least a portion of the one hollow rung with the at least one wheel on an exterior of a side rail of the ladder and a transverse ladder support plate of larger size than the upright member fixed on the upright member above the at least one wheel to support a side rail of the ladder with the upright member extending through the one hollow rung, the transverse ladder support plate having up turned ends that are on opposite sides of the supported side rail and extend above an exterior surface of the side rail supported on the support plate.

2. The support of claim 1, wherein the upright member has an axis that is offset from the wheel such that the wheel trails the axis during forward movement of the ladder.

3. The support of claim 1, wherein the frame includes a unitary rod having the upright member and an offset section, the wheel being mounted at an end of the offset section.

4. The support of claim 3, wherein the transverse ladder support plate is positioned adjacent the offset section and the upright member capable of extending completely through a rung of a ladder supported on the support plate.

5. The support of claim 1 further comprising an aperture across the upright member at a distance greater than a ladder width measured from the transverse ladder support plate to the aperture.

6. A support for transporting a ladder having a plurality of hollow rungs having internal openings extending transversely between a pair of spaced apart, longitudinally extending side rails, the internal openings being open through the side rails, the support comprising a frame having a generally horizontal axle, a pair of wheels on the axle, an upright member that is of cross sectional size to fit through one opening of one side rail and within the internal opening of a hollow rung of the ladder aligned with the one opening with which the upright member is to be used, said upright member being supported on the axle and of length to extend through at least a portion of the hollow rung, the wheels being spaced apart on the axle.

7. The support of claim 6, wherein the upright member has an axis that is offset from the axle such that the axle trails the axis during forward movement of the ladder.

8. The support of claim 6, wherein the upright member has a transverse ladder support fixed thereon to support a side rail of the ladder.

9. The support of claim 6, wherein the upright member has a length to extend completely through a hollow rung of the ladder and provide an outer end portion protruding through the hollow rung, and a device at the outer end portion to prevent movement of the upright member out of the hollow rung.

10. A support for transporting a ladder having a plurality of hollow rungs extending between a pair of spaced apart longitudinally extending side rails, said hollow rungs having internal openings that are open through the side rails, the support comprising a frame having a generally horizontal axle, a pair of spaced apart wheels on the axle, an upright member positioned to extend outwardly from the axle and positioned between the pair of wheels, said upright member being of a cross sectional size to fit through an opening of a side rail and within an internal opening of an aligning hollow rung of a ladder to be supported with the support, a transverse ladder support plate fixed to the upright member spaced from the axle at a location on the upright member such that a length of the upright member will extend through a portion of the hollow rung when a ladder is supported on the support plate, and the transverse ladder support plate having upturned ends that are spaced apart and which will extend on opposite sides of side rails of a ladder to be supported on the support.

* * * * *